July 24, 1956 H. W. MULCAHY 2,755,940
COMBINED RUBBER AND FRICTION SHOCK ABSORBING MECHANISM
Filed Dec. 12, 1952 2 Sheets-Sheet 1

Inventor:
Harry W. Mulcahy.
By Henry Fuchs
Atty.

July 24, 1956  H. W. MULCAHY  2,755,940
COMBINED RUBBER AND FRICTION SHOCK ABSORBING MECHANISM
Filed Dec. 12, 1952  2 Sheets-Sheet 2

Inventor:
Harry W. Mulcahy
By Henry Fuchs
Atty.

United States Patent Office 2,755,940
Patented July 24, 1956

2,755,940

COMBINED RUBBER AND FRICTION SHOCK ABSORBING MECHANISM

Harry W. Mulcahy, Chicago, Ill., assignor to W. H. Miner, Inc., Chicago, Ill., a corporation of Delaware Application December 12, 1952, Serial No. 325,595

9 Claims. (Cl. 213—49)

This invention relates to improvements in combined rubber and friction shock absorbing mechanisms especially adapted for draft riggings of railway cars.

One object of the invention is to provide a shock absorbing mechanism of high capacity, comprising a friction casing, and a combined metal and rubber volute spring resistance means within the casing compressible lengthwise to yieldingly cushion shocks and having frictional contact with the casing to provide frictional resistance in addition to the yielding resistance.

A further object of the invention is to provide a mechanism as set forth in the preceding paragraph, wherein the combined metal and rubber volute spring comprises a volutely coiled member composed of a volutely coiled rubber core member faced on opposite sides by volutely coiled metal elements to which the core member is bonded by being vulcanized thereto, the yielding cushioning resistance being provided by distortion of the rubber core and volute metal elements, and the frictional resistance by sliding contact between the inner and outer metal elements and sliding contact between the outer metal element of the volute spring member and the inner wall of the casing.

Other objects of the invention will more clearly appear from the description and claims hereinafter following.

In the accompanying drawings forming a part of this specification, Figure 1 is a top plan view of my improved shock absorbing mechanism.

Figure 1:
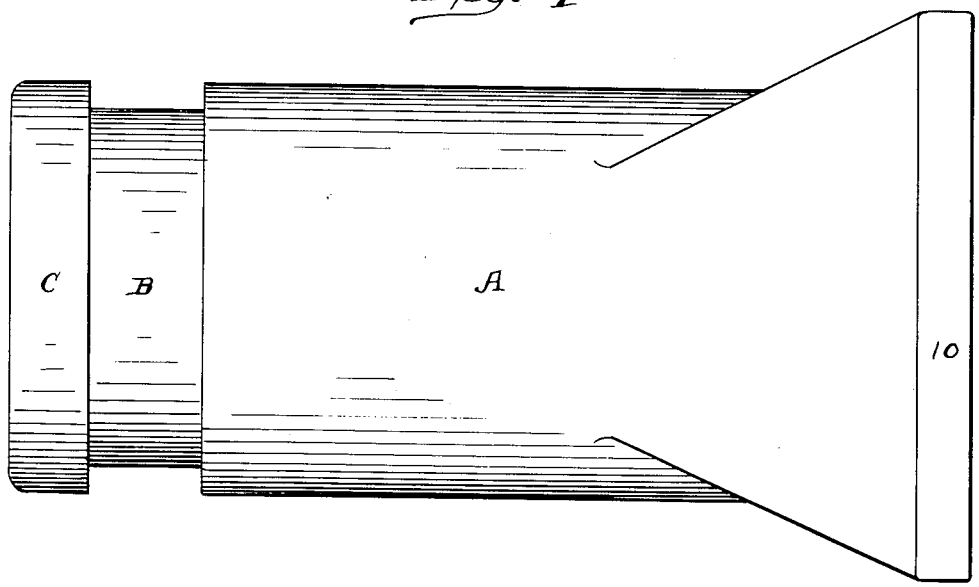
Figure 4:
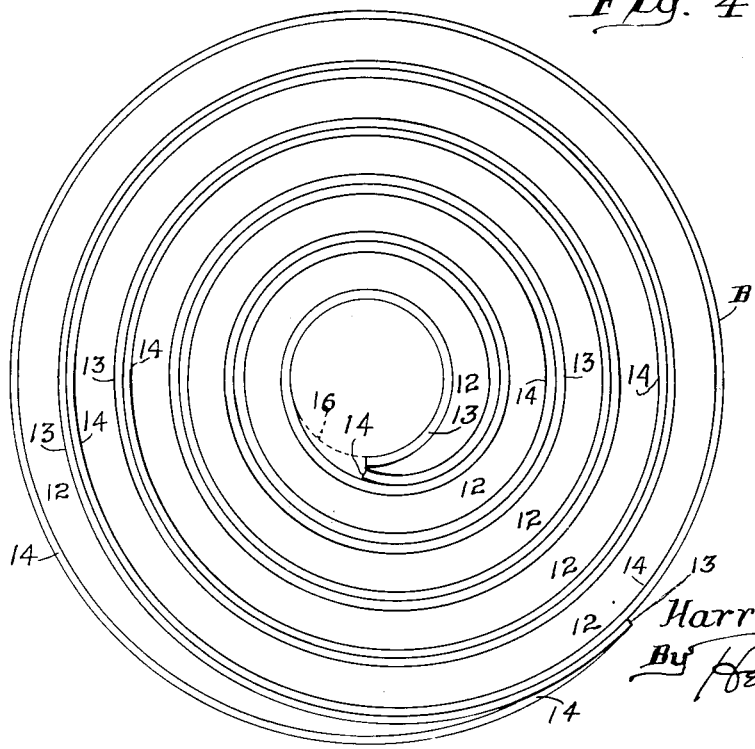
Figure 4 is a front end view, on an enlarged scale, of the combined metal and rubber volute spring shown in Figures 2 and 3.

Referring to the drawings, my improved shock absorbing mechanism comprises broadly a friction casing A, a combined metal and rubber volute spring B within the casing in frictional contact therewith, and a spring follower cap C.

The friction casing A is in the form of a tubular member of circular cross section, open at its front end and closed by a transverse wall 10 at its rear end. The wall 10 is preferably extended outwardly beyond opposite sides of the casing to provide an integral follower member adapted to cooperate with the corresponding stop lugs of the draft rigging of a railway car. The interior of the casing A presents a longitudinally extending, cylindrical friction surface 11.

The combined metal and rubber volute spring B comprises an inner volutely coiled, relatively wide, rubber strip forming a rubber core member 12, and volutely coiled, inner and outer metal strip spring members 13 and 14 vulcanized to the inner and outer sides of the rubber strip forming the core member 12. The strips forming the rubber core member 12 and the inner and outer metal volute spring members 13 and 14 are all of the same width and the edges of the rubber core member are indented, as indicated at 15—15. These indented edges of the rubber core member prevent the rubber from bulging outwardly beyond the edges of the volute metal spring members 13 and 14 when the combined metal and rubber spring B is being compressed. In the assembled condition of the volute spring B, the rubber core member 12 is preferably under slight compression between the metal members 13 and 14.

Figure 3:
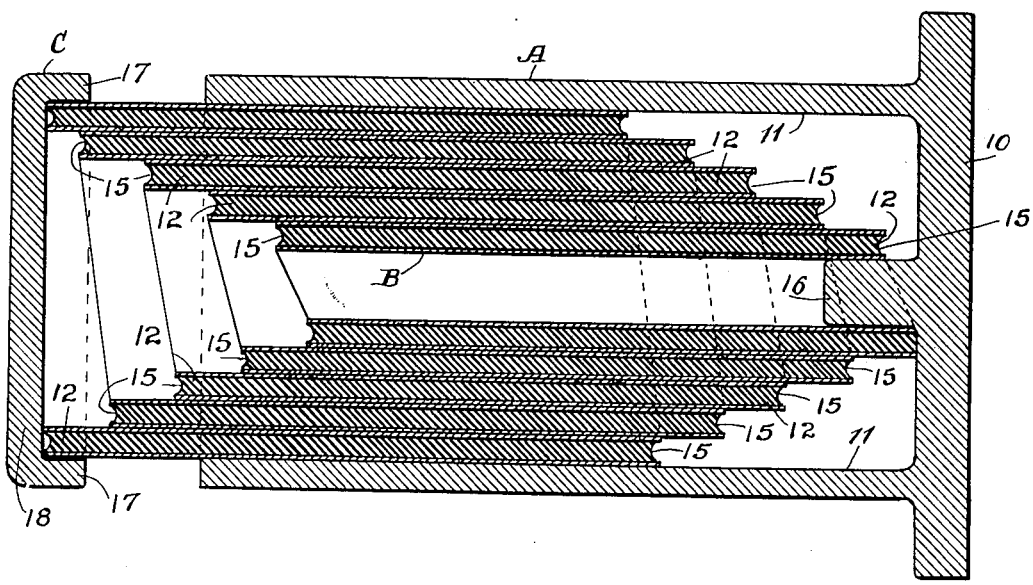
Figure 3 is a horizontal sectional view, corresponding substantially to the line 3—3 of Figure 2.
Figure 2:
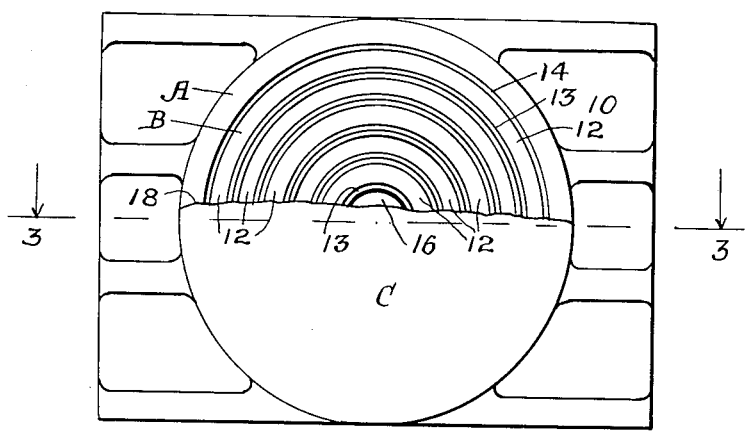
Figure 2 is a front elevational view of Figure 1, looking from left to right in said figure, the follower cap being partly broken away to expose the parts which are located in back of said cap.

As shown in Figure 3, the combined metal and rubber spring B is arranged with the large diameter end at the open front end of the casing A and the small diameter end bearing on the end wall 10 of the casing. The small diameter end of the same is centered by a cylindrical boss 16 on the wall 10 projecting into the inner coil of the combined metal and rubber spring B. The outer and inner metal spring members 13 and 14 are in frictional contact with each other on their inner and outer sides, respectively, and the outer side of the outermost coil, that is, the coil at the large end of the metal spring 14 has contact with the interior friction surface 11 of the casing A.

The spring cap C is of cup-shaped form, comprising a circular disc 18 having an inwardly projecting, peripheral, annular flange 17. The cap C bears on the combined metal and rubber volute spring B and is engaged over the outer end of the same, as shown in Figures 1 and 3.

The operation of my improved shock absorbing mechanism is as follows: Upon compression of the mechanism, the follower cap C is forced inwardly of the casing A, compressing the combined metal and rubber volute spring B, causing the coils of the inner and outer volute metal spring members 13 and 14 thereof to slide on each other, thereby providing a certain amount of frictional resistance. At the same time, the large diameter coil portion of the front or outer end of the outer metal spring member 14 is forced to slide inwardly on the interior friction surface 11 of the casing A, thus providing additional frictional resistance. The volute rubber core member 12, which is bound to the members 13 and 14 is distorted during this action, being subjected to both compression and shearing forces to resist inward movement of the cap C. High shock absorbing capacity is thus had during compression of the mechanism by the frictional resistance provided by the cooperating metal spring members 13 and 14 and the friction casing A, combined with the cushioning effect of the rubber core member 12.

I claim:

1. In a shock absorber, the combination with a friction casing open at one end and closed at the other end and a spring follower cap axially aligned therewith; of a volute spring telescoped within the casing with the small diameter end thereof bearing on the closed end of said casing and the large diameter end portion thereof bearing against said spring follower cap and having sliding frictional engagement with the interior wall of said casing, said volute spring including a volute rubber core member and inner and outer metal volute members embracing said volute core member on the inner and outer sides.

2. In a shock absorber, the combination with a friction casing open at one end and closed at the other end and a spring follower cap axially aligned therewith; of a volute spring telescoped within the casing with the small diameter end thereof bearing on the closed end of said casing and the large diameter end portion thereof bearing against said spring follower cap and having sliding frictional engagement with the interior wall of said casing, said volute spring including a volute rubber core member, and inner and outer volute metal members bonded to the inner and outer sides of said core member, said inner and outer volute metal members being in sliding frictional engagement with each other.

3. In a shock absorber, the combination with a friction casing open at one end and closed at the other end and a spring follower cap axially aligned therewith; of a volute spring telescoped within the casing with the small diameter end thereof bearing on the closed end of said casing and the large diameter end portion thereof bearing against said spring follower cap and having sliding frictional engagement with the interior wall of said casing, said volute spring comprising a volute rubber core member faced on the inner and outer sides by volute metal spring members, said last named members being vulcanized to said rubber core member.

4. In a shock absorber, the combination with a friction casing open at one end and closed at the other end; of a volute spring telescoped within the casing with the small diameter end thereof bearing on the closed end of said casing and the large diameter end portion thereof in sliding frictional engagement with the interior wall of said casing, said volute spring comprising a volute rubber core member and inner and outer volute metal members embracing said core member on the inner and outer sides, said volute metal members being in face to face frictional engagement with each other; and a follower cap bearing on the large diameter end of said volute spring.

5. A combined rubber and metal compression volute spring including a volute rubber core member and separate inner and outer volute metal members bonded to the inner and outer sides of said core member and in slidable frictional engagement with each other as the spring is compressed.

6. A combined rubber and metal compression volute spring comprising a volute rubber core member faced on the inner and outer sides by separate volute metal spring members which are in slidable frictional engagement with each other during compression and expansion of the spring.

7. A combined rubber and metal compression volute spring including a volute rubber core member and inner and outer volute metal members embracing said core member on the inner and outer sides, said core member being vulcanized to said metal members, and said inner and outer metal members being in frictional face to face contact with each other.

8. A combined rubber and metal compression volute spring composed of an inner volute metal spring member, a volute rubber core member coiled about the coils of said inner metal spring member, and an outer volute metal spring member coiled about the coils of said volute core member, the volute coils of said inner and outer members being in contact with the volute coils of said core member, and bonded to the latter and said inner and outer members being in slidable frictional engagement with each other during compression and expansion of the spring.

9. A combined rubber and metal compression volute spring composed of an inner volute metal spring member, a volute rubber core member coiled about said inner metal member and an outer volute metal spring member coiled about the coils of said core member, the coils of said inner and outer metal members being bonded to said rubber core member, and said inner and outer volute metal spring members being in slidable frictional engagement with each other during compression and expansion of the spring.

References Cited in the file of this patent

UNITED STATES PATENTS

| | | |
|---|---|---|
| 337,048 | Davis | Mar. 2, 1886 |
| 2,099,031 | Neal et al. | Nov. 16, 1937 |
| 2,127,219 | Hirshfeld | Aug. 16, 1938 |
| 2,158,028 | Burke | May 9, 1939 |
| 2,565,650 | Dath | Aug. 28, 1951 |
| 2,588,488 | Dath | Mar. 11, 1952 |
| 2,641,463 | Mulcahy | June 9, 1953 |

FOREIGN PATENTS

| | | |
|---|---|---|
| 722,719 | Germany | July 18, 1942 |
| 14,688 | Netherlands | June 15, 1926 |
| 829,939 | France | Apr. 25, 1938 |